US009377812B2

(12) United States Patent

Kato

(10) Patent No.: US 9,377,812 B2

(45) Date of Patent: Jun. 28, 2016

(54) PORTABLE APPARATUS AND DETERMINATION METHOD

(71) Applicant: Fujitsu Mobile Communications Limited, Kawasaki-shi, Kanagawa (JP)

(72) Inventor: Masataka Kato, Kawasaki (JP)

(73) Assignee: FUJITSU MOBILE COMMUNICATIONS LIMITED, Kawasaki (JP)

(*) Notice: Subject to any disclaimer, the term of this patent is extended or adjusted under 35 U.S.C. 154(b) by 144 days.

(21) Appl. No.: 14/069,022

(22) Filed: Oct. 31, 2013

(65) Prior Publication Data

US 2014/0221050 A1 Aug. 7, 2014

(30) Foreign Application Priority Data

Feb. 6, 2013 (JP) ................................ 2013-021056

(51) Int. Cl.

*G06F 1/00* (2006.01)
*G06F 1/16* (2006.01)
*H04M 1/725* (2006.01)
*G06F 3/0354* (2013.01)

(52) U.S. Cl.

CPC ............ *G06F 1/1626* (2013.01); *G06F 1/1671* (2013.01); *G06F 1/1692* (2013.01); *G06F 3/03547* (2013.01); *H04M 1/72519* (2013.01); *H04M 2250/22* (2013.01)

(58) Field of Classification Search

USPC ........ 455/566, 575.3, 575.1, 550.1, 574, 425, 455/557; 345/172, 173, 650, 174, 168, 156, 345/160

See application file for complete search history.

(56) References Cited

U.S. PATENT DOCUMENTS

2009/0296331 A1* 12/2009 Choy .................... G06F 1/1616 361/679.09
2011/0143815 A1* 6/2011 Inami ................. H04M 1/0235 455/566
2012/0011438 A1* 1/2012 Kim ...................... G06F 1/1626 715/702
2012/0242578 A1* 9/2012 Laubach ............... G06F 3/0213 345/160
2013/0113723 A1* 5/2013 Chen ....................... G06F 21/30 345/173
2013/0174039 A1* 7/2013 Lee ................... G06F 17/30852 715/723
2013/0215153 A1* 8/2013 Park ....................... G09G 5/363 345/650
2013/0324192 A1* 12/2013 Lee .................. H04M 1/72544 455/557
2014/0247246 A1* 9/2014 Maus ...................... G06F 3/044 345/174

FOREIGN PATENT DOCUMENTS

JP 2008-125096 A 5/2008
JP 2008-244743 A 10/2008

* cited by examiner

*Primary Examiner* — Ganiyu A Hanidu
(74) *Attorney, Agent, or Firm* — Maschoff Brennan

(57) ABSTRACT

A disclosed portable apparatus includes: a first touch switch that is installed on a first surface of a housing of the portable apparatus; a second touch switch that is installed on a second surface of the housing, which is opposite to the first surface; and a determination unit configured to determine whether or not the first surface and the second surface are simultaneously touched, based on outputs of the first touch switch and the second touch switch. The portable apparatus may further include a first controller configured to release a lock function upon determining that the first surface and the second surface are simultaneously touched, and to activate the lock function upon determining that the first surface and the second surface are not simultaneously touched.

12 Claims, 18 Drawing Sheets

PORTABLE APPARATUS AND DETERMINATION METHOD

CROSS-REFERENCE TO RELATED APPLICATIONS

This application is based upon and claims the benefit of priority of the prior Japanese Patent Application No. 2013-021056, filed on Feb. 6, 2013, the entire contents of which are incorporated herein by reference.

FIELD

This invention relates to a technique for determining a holding state of a device.

BACKGROUND

A certain patent document discloses a cellular phone to set key lock or not to release the key lock regardless of the intention of the user. This cellular phone has two touch switches . The two touch switches are provided on the same surface, and the cellular phone distinguishes "ON" and "OFF" of the key lock setting by the sequence of touching. In other words, when the user sets "ON" as the key lock setting, the user performs a slide touch operation in a predetermined direction, and when the user sets "OFF" as the key lock setting, the user performs a slide touch operation in another direction.

This technique premises that the user normally holds the cellular phone, however, even if the user does not normally hold the cellular phone, when any portion of the human body touches the touch switch, the cellular phone detects an operation relating to the key lock. Therefore, the cellular phone may perform an operation in contradiction to the user's intention.

Another prior document discloses a technique for controlling so as not to change the direction of an object on a display screen of a portable terminal with a camera even when at least one housing of the portable terminal is rotated in a state where the object is displayed on the display screen of the portable terminal. This portable terminal determines the direction of the display screen by an angle of a hinge that couples the housing including the display screen with the housing including the camera to rotate the image including the object.

In this technique, because the direction of the display screen is determined based on the relationship between the housing including the display screen and the housing including the camera, the direction of the display screen is not identified, when the user does not fixedly have the housing including the camera.

As an aspect, an object of this invention is to determine whether or not the user holds a portable apparatus.

SUMMARY

A portable apparatus relating to this invention includes: a first touch switch that is installed on a first surface of a housing of the portable terminal; a second touch switch that are installed on a second surface of the housing, which is opposite to the first surface; and a determination unit configured to determine whether or not the first surface and the second surface are simultaneously touched, based on outputs of the first touch switch and the second touch switch.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

[Embodiment 1]

A housing of a cellular phone terminal relating to this embodiment has plural touch switches.

Figure 1:
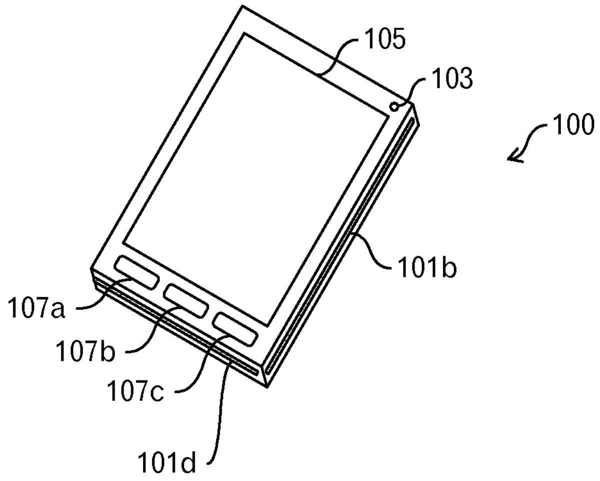
FIG. 1 is a diagram of an oblique view of a cellular phone terminal.

FIG. 1 is an oblique diagram of the cellular phone terminal. The cellular phone terminal 100 is an example of the portable apparatuses. A touch switch 101*b* is installed on the right side of the cellular phone terminal 100. A touch switch 101*d* is installed on the bottom side of the cellular phone terminal 100. A proximity sensor 103 is installed on the front of the cellular phone terminal 100. The proximity sensor 103 detects an adjacent object if it exists. In this example, the proximity sensor 103 is installed on upper right of the front side, however, may be provided on another portion. A display surface 105 is also installed on the front of the cellular phone terminal 100. Keys 107*a* to 107*c* are arranged on the lower portion in front of the cellular phone terminal 100.

Figure 2:
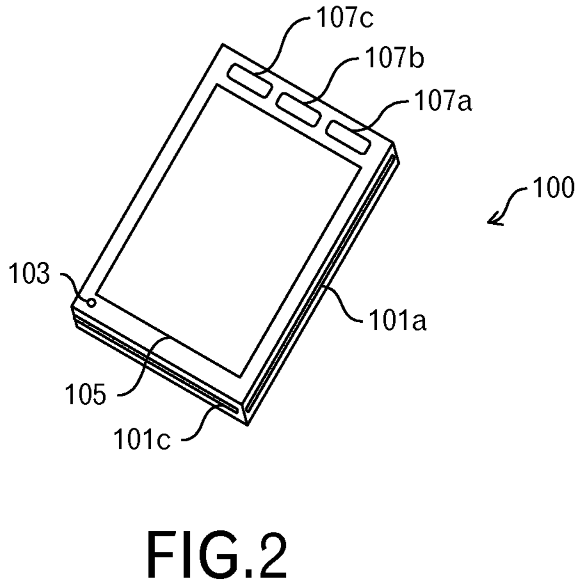
FIG. 2 is a diagram of an oblique view of the cellular phone terminal.

FIG. 2 is another oblique diagram of the cellular phone terminal 100. A touch switch 101*a* is installed on the left side of the cellular phone terminal 100. A touch switch 101*c* is installed on the top side of the cellular phone terminal 100. The proximity sensor 103, display surface 105 and keys 107*a* to 107*c* are the same as those in FIG. 1.

Figure 3:
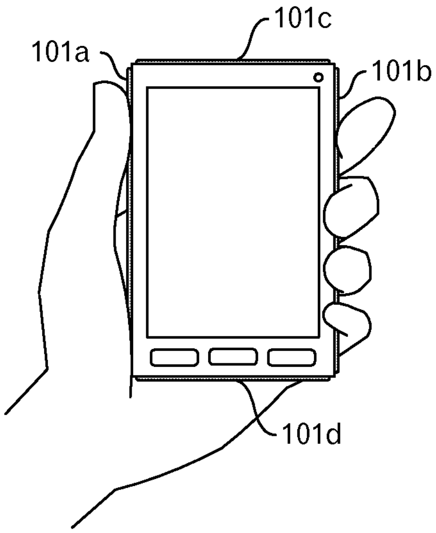
FIG. 3 is a diagram depicting a state that the cellular phone terminal is grasped.

Next, various states where the cellular phone terminal 100 is held will be explained. First, a state will be explained in which the user holds the cellular phone terminal 100 with one hand in the vertical direction. FIG. 3 illustrates a state in which the cellular phone terminal 100 is grasped. More specifically, the cellular phone terminal 100 is grasped with the left hand. In this state, the thumb touches the touch switch 101*a* . Furthermore, the forefinger to the little finger touch the touch switch 101*b*. Therefore, the touch switch 101*a* and touch switch 101*b* detect a touched state (hereinafter, referred to "ON") , and the touch switch 101*c* and touch switch 101*d* detect an untouched state (hereinafter, referred to "OFF") . When the cellular phone terminal 100 is grasped with the right hand, the touch switch 101*a* and touch switch 101*b* similarly detect "ON", and the touch switch 101*c* and touch switch 101*d* detect "OFF".

Figure 4:
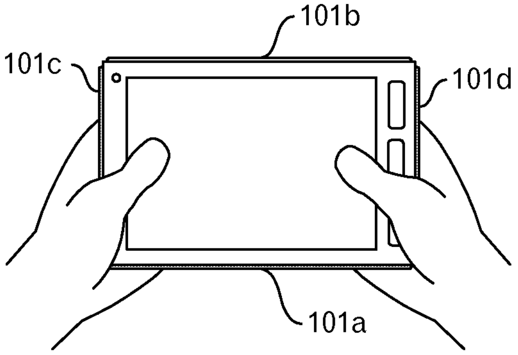
FIG. 4 is a diagram depicting a state that the cellular phone terminal is grasped.

Next, a state will be explained in which the user holds the cellular phone terminal 100 with both hands sideways. FIG. 4 illustrates a state in which the cellular phone terminal 100 is grasped. In this state, the left hand touches the touch switch 101*c*, and the right hand touches the touch switch 101*d*. Therefore, the touch switch 101*c* and touch switch 101*d* detect "ON", and the touch switch 101*a* and touch switch 101*b* detect "OFF".

Figure 5:
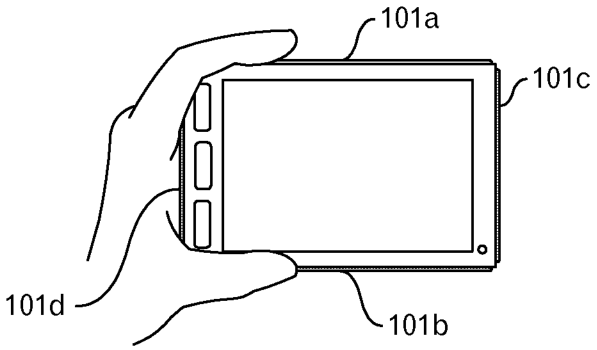
FIG. 5 is a diagram depicting a state that the cellular phone terminal is grasped.

Next, a state will be explained in which the user holds the cellular phone terminal 100 with one hand sideways. FIG. 5 illustrates a state in which the cellular phone terminal 100 is grasped. The forefinger touches the touch switch 101*a*, and the palm touches the touch switch 101*d*, and the thumb touches the touch switch 101*b*. Therefore, the touch switch 101*a*, touch switch 101*b* and touch switch 101*d* detect "ON", and the touch switch 101*c* detects "OFF".

When passing the cellular phone terminal 100 from the left hand to the right hand, the forefinger touches the touch switch 101*a*, and the palm touches the touch switch 101*c*, and the thumb touches the touch switch 101*b*. Therefore, the touch switch 101*a*, touch switch 101*b* and touch switch 101*c* detect "ON", and the touch switch 101*d* detects "OFF".

Figure 6:
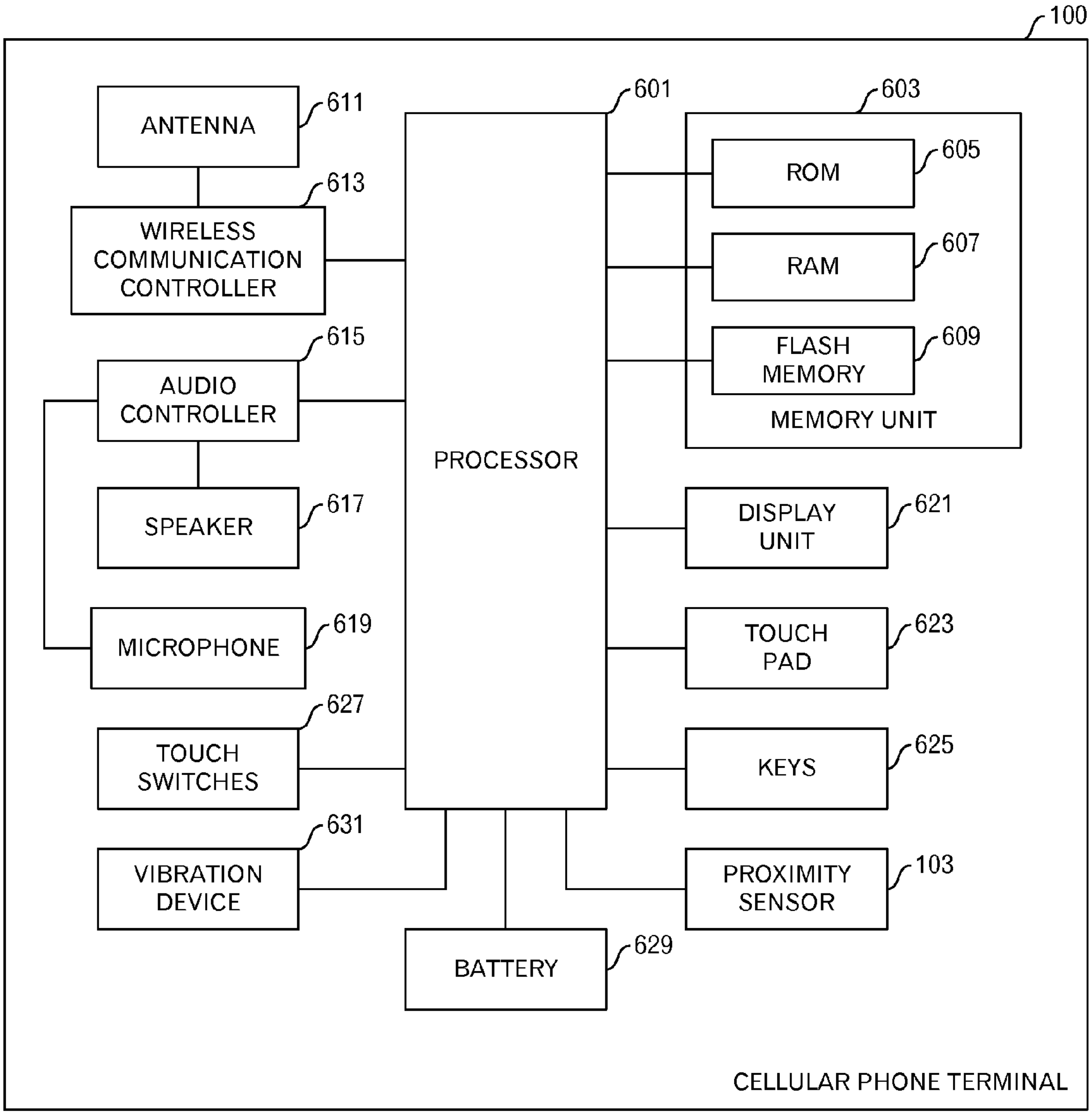
FIG. 6 is a diagram depicting a hardware configuration example of the cellular phone terminal.

Next, a hardware configuration of the cellular phone terminal 100 will be explained. FIG. 6 illustrates a hardware configuration example of the cellular phone terminal 100. The cellular phone terminal 100 has a processor 601, memory unit 603, antenna 611, wireless communication controller 613, audio controller 615, speaker 617, microphone 619, display unit 621, touch pad 623, keys 625, touch switches 627, battery 629, vibration device 631 and proximity sensor 103.

The processor 601 may include a modem Central Processing Unit (CPU) and application CPU. The memory unit 603 has a Read Only Memory (ROM) 605, Random Access Memory (RAM) 607 and flash memory 609. The ROM 605 stores programs such as application programs. The RAM 607 includes an area in which programs such as application programs are expanded, for example. The flash memory 609 stores user data, for example.

The touch pad 623 is a planar sensor disposed on the display screen of the display unit 621, for example, and accepts an instruction by a touch operation. The display unit 621 displays various screens instructed by the application programs, for example. More specifically, the touch panel implemented by combining the display unit 621 and touch pad 623 is used. The touch pad 623 is an example of pointing devices.

The display unit 621 may be an organic electroluminescence display or liquid crystal display. The touch pad 623 may be resistance film type, capacitance type, optical, or electromagnetic induction type touch pad. The display surface 105 illustrated in FIG. 1 is a surface of the display unit 621.

The antenna 611 receives wireless data in cellular method, wireless Local Area Network (LAN) type, near field communication method or the like. The wireless communication controller 613 controls the wireless communication. By controlling the wireless communication, voice communication for call and data communication for mail are performed.

The audio controller 615 performs analog-digital conversion and digital-analog conversion for sound data. The speaker 617 outputs sounds as analog data. The microphone 619 converts sounds to analog data.

The keys 625 correspond to the aforementioned keys 107*a* to 107*c*. The touch switches 627 correspond to the aforementioned touch switches 101*a* to 101*d*. The battery 629 supplies the power to each device illustrated in FIG. 6. The vibration device 631 is used for notification by vibration.

Figure 7:
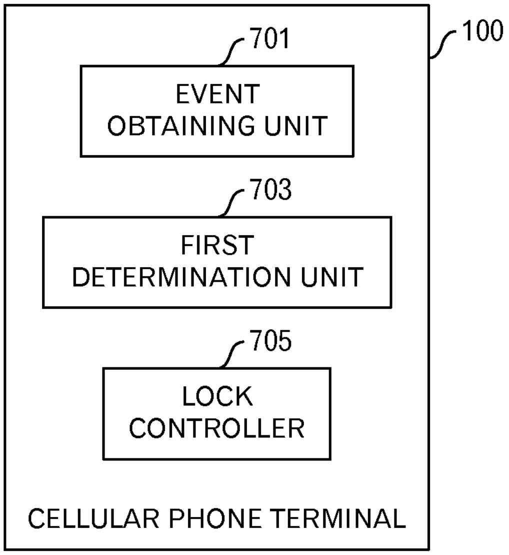
FIG. 7 is a diagram depicting a module configuration example of the cellular phone terminal.

Next, a program module configuration relating to this embodiment will be explained. FIG. 7 illustrates a program module configuration example of the cellular phone terminal 100. In this embodiment, the cellular phone terminal 100 has an event obtaining unit 701, a first determination unit 703 and a lock controller 705. The event obtaining unit 701 obtains events. The first determination unit 703 determines modes relating to this embodiment. The lock controller 705 controls a lock function.

Figure 8:
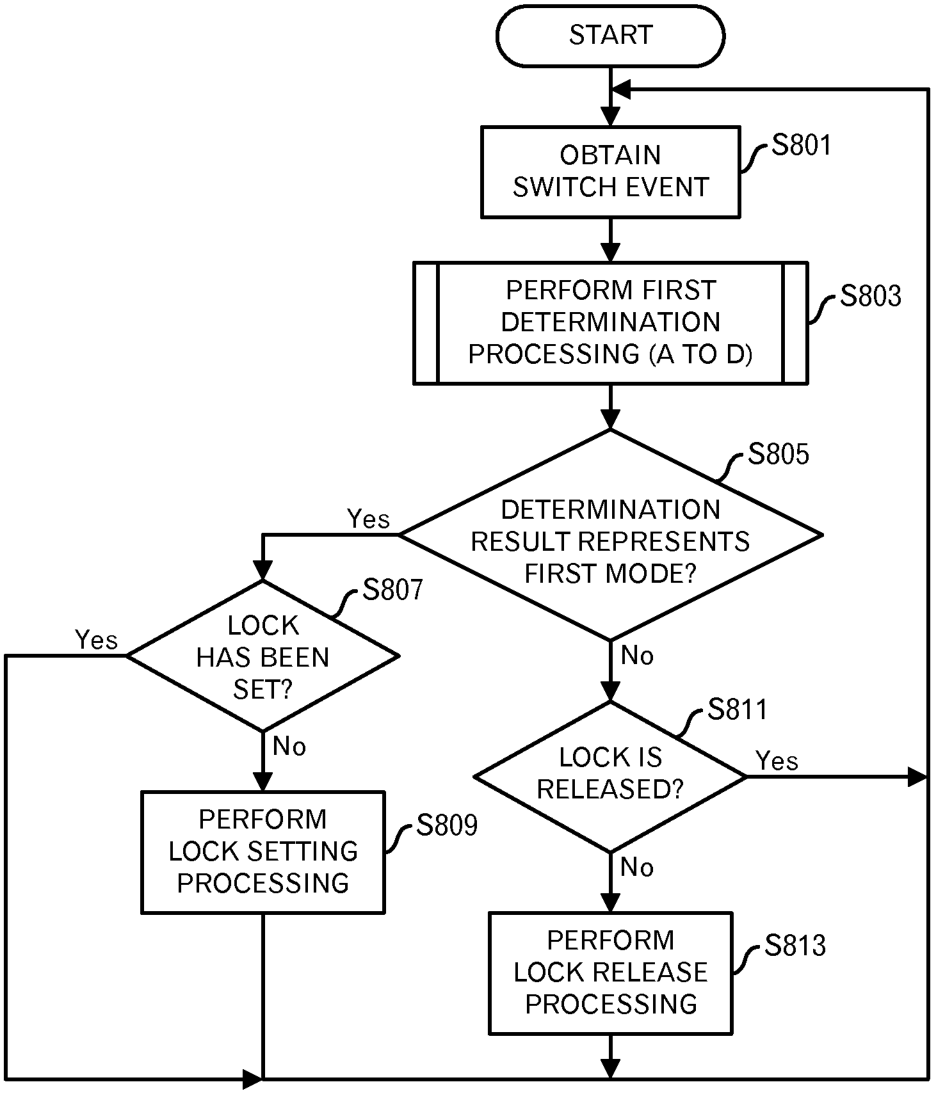
FIG. 8 is a diagram depicting an entire processing flow relating to a first embodiment.

Next, a processing in this embodiment will be explained. FIG. 8 illustrates an entire processing flow. The event obtaining unit 701 obtains a switch event (S801). The first determination unit 703 performs a first determination processing A (S803). However, the first determination processing (B to D) that will be explained later may be performed.

Figure 9:
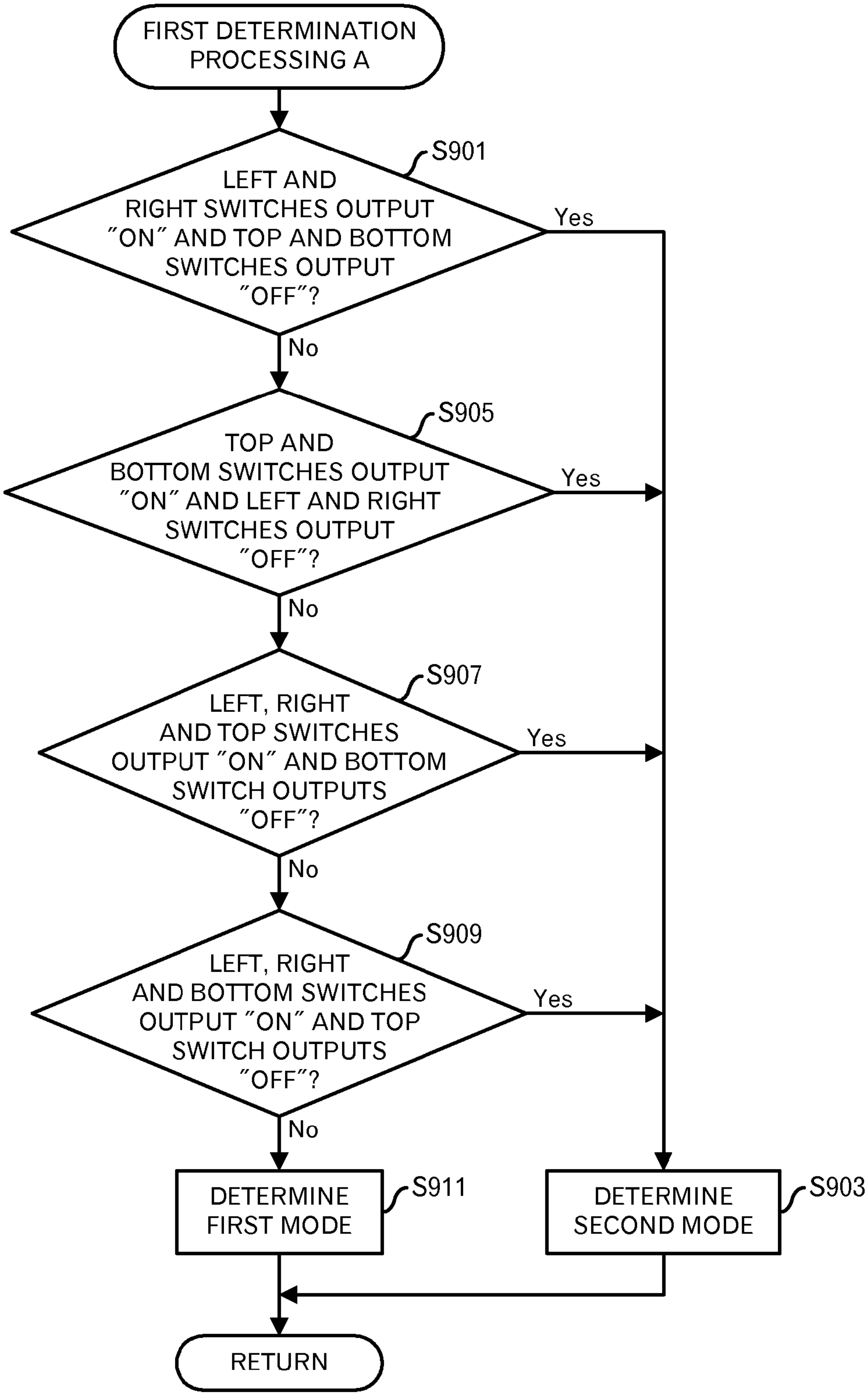
FIG. 9 is a diagram depicting a first determination processing flow A.

FIG. 9 illustrates a processing flow of the first determination processing A. The first determination unit 703 determines whether or not a present state is a state in which the touch switch 101*a* and touch switch 101*b* detect "ON", and the touch switch 101*c* and touch switch 101*d* detect "OFF" (S901).

In other words, the first determination unit 703 determines by using a detection result of the touch switch 101*a* whether or not the left side is touched, and determines by using a detection result of the touch switch 101*b*, whether or not the right side is touched, similarly to the left side. Moreover, the first determination unit 703 determines by using a detection result of the touch switch 101*c* whether or not the top side is touched, and also determines by using a detection result of the touch switch 101*d*, whether or not the bottom side is touched.

When it is determined that the present state is the state in which the touch switch 101*a* and touch switch 101*b* detect "ON", and the touch switch 101*c* and touch switch 101*d* detect "OFF", the first determination unit 703 determines that the present mode is a second mode (S903), and the processing returns to the calling-source processing. The second mode represents a state in which it is presumed that the cellular phone terminal 100 is grasped. This state corresponds to the state illustrated in FIG. 3.

On the other hand, when it is determined that the present state is not a state in which the touch switch 101*a* and touch switch 101*b* detect "ON", and the touch switch 101*c* and touch switch 101*d* detect "OFF", the first determination unit 703 determines whether or not the touch switch 101*c* and touch switch 101*d* detect "ON", and the touch switch 101*a* and touch switch 101*b* detect "OFF"(S905). When it is determined that the present state is a state in which the touch switch 101*c* and touch switch 101*d* detect "ON", and the touch switch 101*a* and touch switch 101*b* detect "OFF", the first determination unit 703 determines that the present mode is the second mode (S903), and the processing returns to the calling-source processing. This state corresponds to the state illustrated in FIG. 4.

On the other hand, when it is determined that the present state is not a state in which the touch switch 101*c* and touch switch 101*d* detect "ON", and the touch switch 101*a* and touch switch 101*b* detect "OFF", the first determination unit 703 determines whether or not the present state is a state in which the touch switch 101*a*, touch switch 101*b* and touch switch 101*c* detect "ON", and the touch switch 101*d* detects "OFF" (S907). When it is determined that the present state is a state in which the touch switch 101*a*, touch switch 101*b* and touch switch 101*c* detect "ON", and the touch switch 101*d* detects OFF, the first determination unit 703 determines that the present mode is the second mode (S903), and the processing returns to the calling-source processing. This state corresponds to a state illustrated in FIG. 5, in which the cellular phone terminal 100 is passed from the left hand to the right hand.

On the other hand, when it is determined that the present state is not a state in which the touch switch 101*a*, touch switch 101*b* and touch switch 101*c* detect "ON", and the touch switch 101*d* detects "OFF", the first determination unit 703 determines whether or not the present state is a state in which the touch switch 101*a*, touch switch 101*b* and touch switch 101*d* detect "ON", and the touch switch 101*c* detects "OFF" (step S909). When it is determined that the present state is a state in which the touch switch 101*a*, touch switch 101*b* and touch switch 101*d* detect "ON", and the touch switch 101*c* detects "OFF", the first determination unit 703 determines that the present mode is the second mode (S903), and the processing returns to the calling-source processing. This state corresponds to the state illustrated in FIG. 5.

On the other hand, when it is determined that the present state is not a state in which the touch switch 101*a*, touch switch 101*b* and touch switch 101*d* detect "ON", and the touch switch 101*c* detects "OFF", the first determination unit 703 determines that the present mode is a first mode (S911), and the processing returns to the calling-source processing. The first mode represents a state in which it is presumed that the cellular phone terminal 100 is not grasped.

When the first determination processing A ends, the processing returns to S805 in FIG. 8.

Returning to the explanation of the entire processing flow in FIG. 8, the lock controller 705 determines whether the determination result represents the first mode or second mode (S805) . When it is determined that the determination result represents the first mode, the lock controller 705 determines whether or not the lock has been set (S807). When it is determined that the lock has not been set, the lock controller 705 performs a lock setting processing (S809), and the processing then returns to S801. With this processing, the cellular phone terminal 100 becomes in a state "being locked". When it is determined that the lock has been set, the processing returns to S801.

When it is determined at S805 that the determination result represents the second mode, the lock controller 705 determines whether or not the lock has been unlocked (step S811). When it is determined that the lock has not been unlocked, the lock controller 705 performs an unlock processing (S813), and the processing returns to S801. With this processing, the cellular phone terminal 100 becomes in a state "being unlocked". On the other hand, when it is determined that the lock has been unlocked, the processing returns to S801. The lock controller 705 may display a screen for inputting a password before the unlock processing (S813), and may perform the unlock processing when the user is authenticated by the received password.

According to this embodiment, by detecting whether or not at least two opposite surfaces of the housing such as the left and right surfaces or top and bottom surfaces are simultaneously touched, it is possible to determine whether or not the cellular phone terminal 100 is grasped by the user.

Thus, because the lock function is released when the portable terminal is grasped by the user, it is possible to make the release operation by the user unnecessary and for the user to use the portable terminal soon when grasping the portable terminal.

Therefore, when the cellular phone terminal 100 is released, the cellular phone terminal 100 is automatically locked, and the security is always secured.

[Embodiment 2]

In this embodiment, an example will be explained that the mode determination is performed by using the proximity sensor 103. In this example, when detecting an adjacent object, it is presumed that the portable terminal is in an unused state such as in a pocket, and it is determined that the portable terminal is in the first mode.

The module configuration is as illustrated in FIG. 7.

Figure 10:
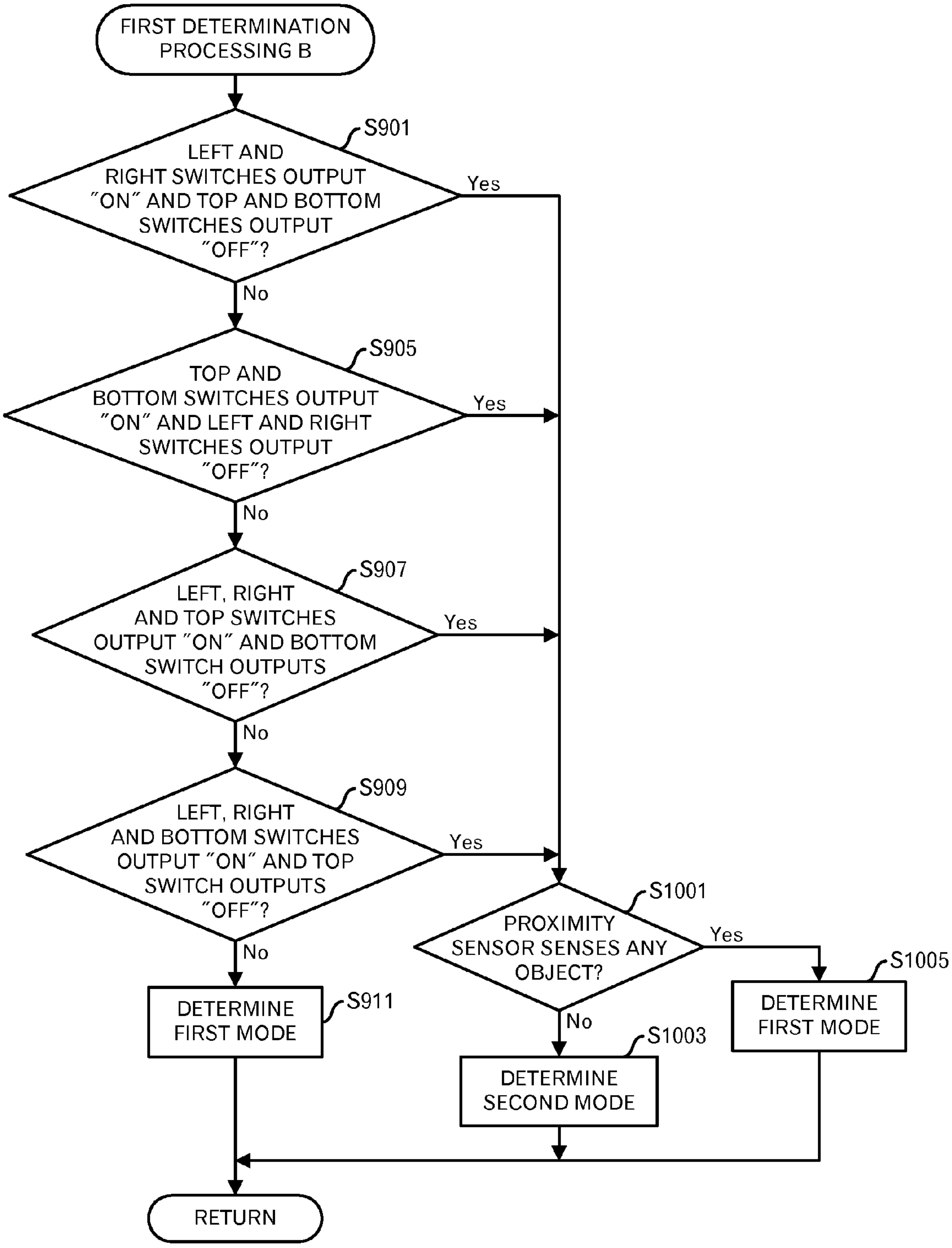
FIG. 10 is a diagram depicting a first determination processing flow B.

Next, a processing in this embodiment will be explained. FIG. 10 illustrates a first determination processing B. When it is determined at S901 that the touch switch 101*a* and touch switch 101*b* detect "ON" and the touch switch 101*c* and touch switch 101*d* detect "OFF", the first determination unit 703 determines whether or not the proximity sensor 103 senses any object (S1001). When it is determined that the proximity sensor 103 does not sense any object, the first determination unit 703 determines that the present mode is the second mode (S1003), and the processing returns to the calling-source processing. On the other hand, when it is determined that the proximity sensor 103 senses any object, the first determination unit 703 determines that the present mode is the first mode (S1005), and the processing returns to the calling-source processing.

When it is determined at S905 that the present state is the state that the touch switch 101*c* and touch switch 101*d* detect "ON" and the touch switch 101*a* and touch switch 101*b* detect "OFF", the processing shifts to a processing of S1001, similarly to the aforementioned case.

In addition, when it is determined at S907 that the present state is the state that the touch switch 101*a*, touch switch 101*b* and touch switch 101*c* detect "ON", and the touch switch 101*d* detects "OFF", the processing shifts to the processing of S1001, similarly to the aforementioned case.

When it is determined at S909 that the present state is the state that the touch switch 101*a*, touch switch 101*b* and touch switch 101*d* detect "ON" and the touch switch 101*c* detects "OFF", the processing shifts to the processing of S1001, similarly to the aforementioned case. Other processing is the same as that in FIG. 9.

According to this embodiment, it is presumed that the portable terminal is in an unused state such as in a pocket, and it is possible to handle the unused state similarly to the state that the cellular phone terminal 100 is not grasped.

[Embodiment 3]

In this embodiment, an example will be explained that the touch switch 101*c* and touch switch 101*d* are omitted.

Figure 11:
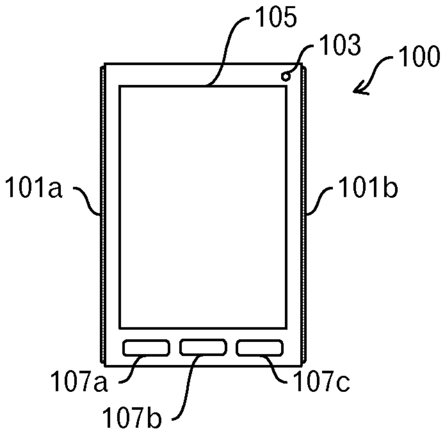
FIG. 11 is a diagram of a front view of the cellular phone terminal relating to a third embodiment.

FIG. 11 illustrates a front view of a cellular phone terminal 100 relating to the third embodiment. The touch switch 101*a* is installed at the left side, similarly to that in the first embodiment. Moreover, the touch switch 101*b* is installed at the right side, similarly to that in the first embodiment. However, the aforementioned touch switch 101*c* is not installed at the top side. Furthermore, the aforementioned touch switch 101*d* is not also installed at the bottom side.

The module configuration is as illustrated in FIG. 7.

Figure 12:
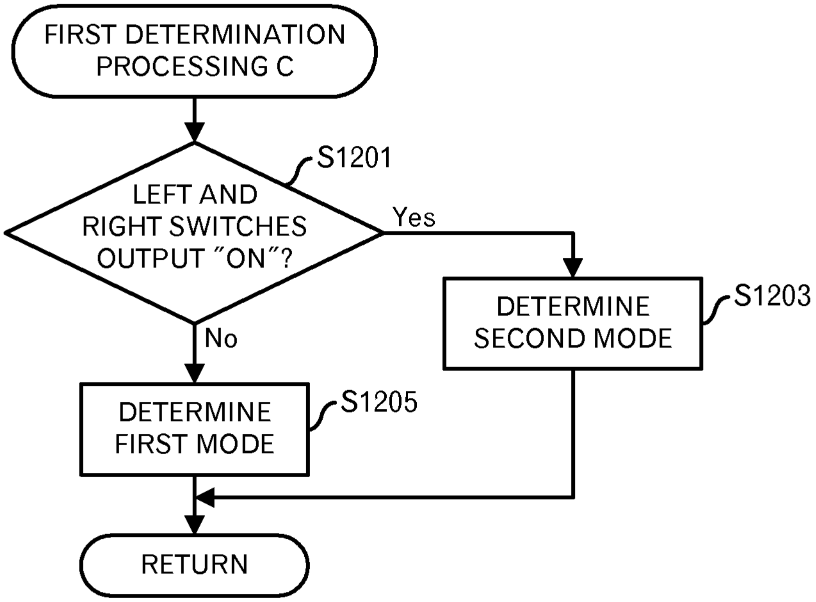
FIG. 12 is a diagram depicting a first determination processing flow C.

Next, a processing in this embodiment will be explained. FIG. 12 illustrates a first determination processing C. The first determination unit 703 determines whether or not the present state is a state that the touch switch 101*a* and touch switch 101*b* detect "ON" (S1201). When it is determined that the present state is the state that the touch switch 101*a* and touch switch 101*b* detect "ON", the first determination unit 703 determines that the present mode is the second mode (S1203). When it is determined that the present state is not the state that the touch switch 101*a* and touch switch 101*b* detect "ON", the first determination unit 703 determines that the present mode is the first mode (S1205).

In this example, the touch switch 101*c* and touch switch 101*d* are omitted. However, the touch switch 101*a* and touch switch 101*b* may be omitted. In such a case, at the S1201 of the first determination processing C, the first determination unit 703 determines whether or not the present state is a state that the touch switch 101*c* and touch switch 101*d* detect "ON". When it is determined that the present state is the state that the touch switch 101*c* and touch switch 101*d* detect "ON", the first determination unit 703 determines at S1203 that the present mode is the second mode. When it is determined that it is not in the state that the touch switch 101*c* and touch switch 101*d* detect "ON", the first determination unit 703 determines at S1205 that the present mode is the first mode.

According to this embodiment, by detecting whether or not two opposite surfaces of the housing are touched, it is possible to determine whether or not the cellular phone terminal 100 is grasped by the user.

[Embodiment 4]

In this embodiment, an example will be explained that the touch switch 101 is installed on the rear surface.

Figure 13:
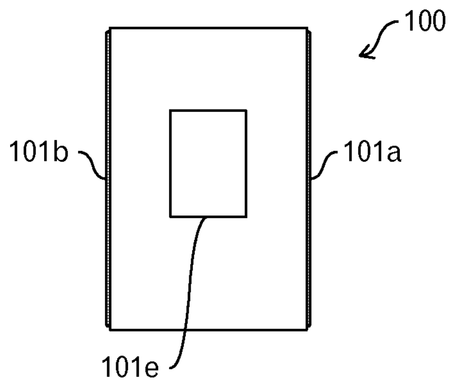
FIG. 13 is a diagram of a rear view of the cellular phone terminal relating to a fourth embodiment.

FIG. 13 illustrates a rear view of the cellular phone terminal 100 relating to the fourth embodiment. A touch switch 101*e* is installed on the rear surface of the cellular phone terminal 100.

The module configuration is as illustrated in FIG. 7.

Figure 14:
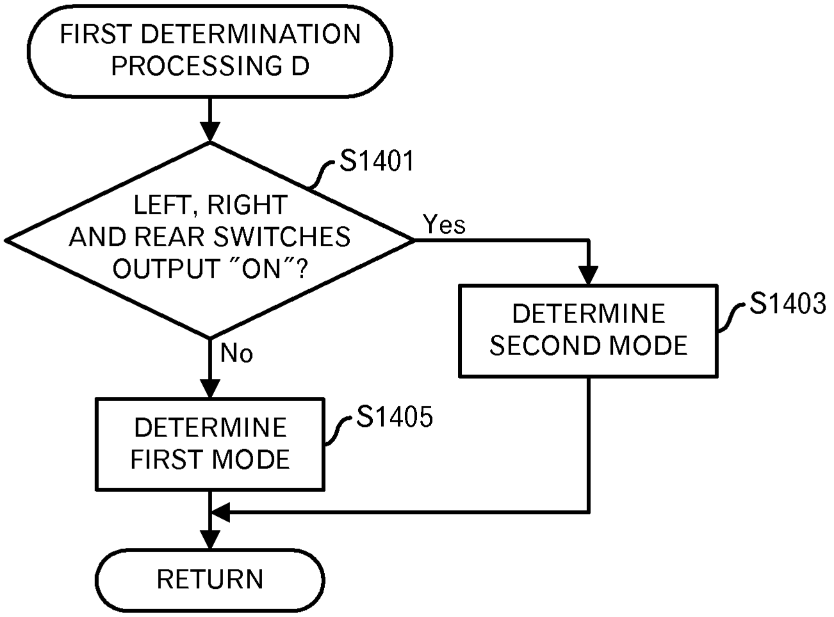
FIG. 14 is a diagram depicting a first determination processing flow D.

Next, a processing in this embodiment will be explained. FIG. 14 illustrates a first determination processing D. The first determination unit 703 determines whether or not it is in a state that the touch switch 101*a*, touch switch 101*b* and touch switch 101*e* detect "ON"(S1401). When it is determined that the present sate is the state that the touch switch 101*a*, touch switch 101*b* and touch switch 101*e* detect "ON", the first determination unit 703 determines that the present mode is the second mode (S1403). When it is determined that the present sate is not the state that the touch switch 101*a*, touch switch 101*b* and touch switch 101*e* detect "ON", the first determination unit 703 determines that the present mode is the first mode (S1405).

As illustrated in FIGS. 3 to 5, in a state that the user grasps the cellular phone terminal 100, this example pays attention to the fact that the rear surface is also touched. In other words, when the rear surface is not touched, it is presumed that it is in the state that the user does not grasp the cellular phone terminal 100. Therefore, when the touch switch 101*e* detects "OFF" as described above, it is determined that the present mode is the first mode instead of the second mode.

In this example, the touch switch 101*e* is added based on the third embodiment. However, the touch switch 101*e* may be added based on the first embodiment.

According to this embodiment, by detecting whether or not the rear surface is simultaneously touched, it is possible to presume the grasped state.

[Embodiment 5]

In this embodiment, an example will be explained that the lock is set after a predetermined time elapsed since the first mode was detected.

The module configuration is as illustrated in FIG. 7.

Figure 15:
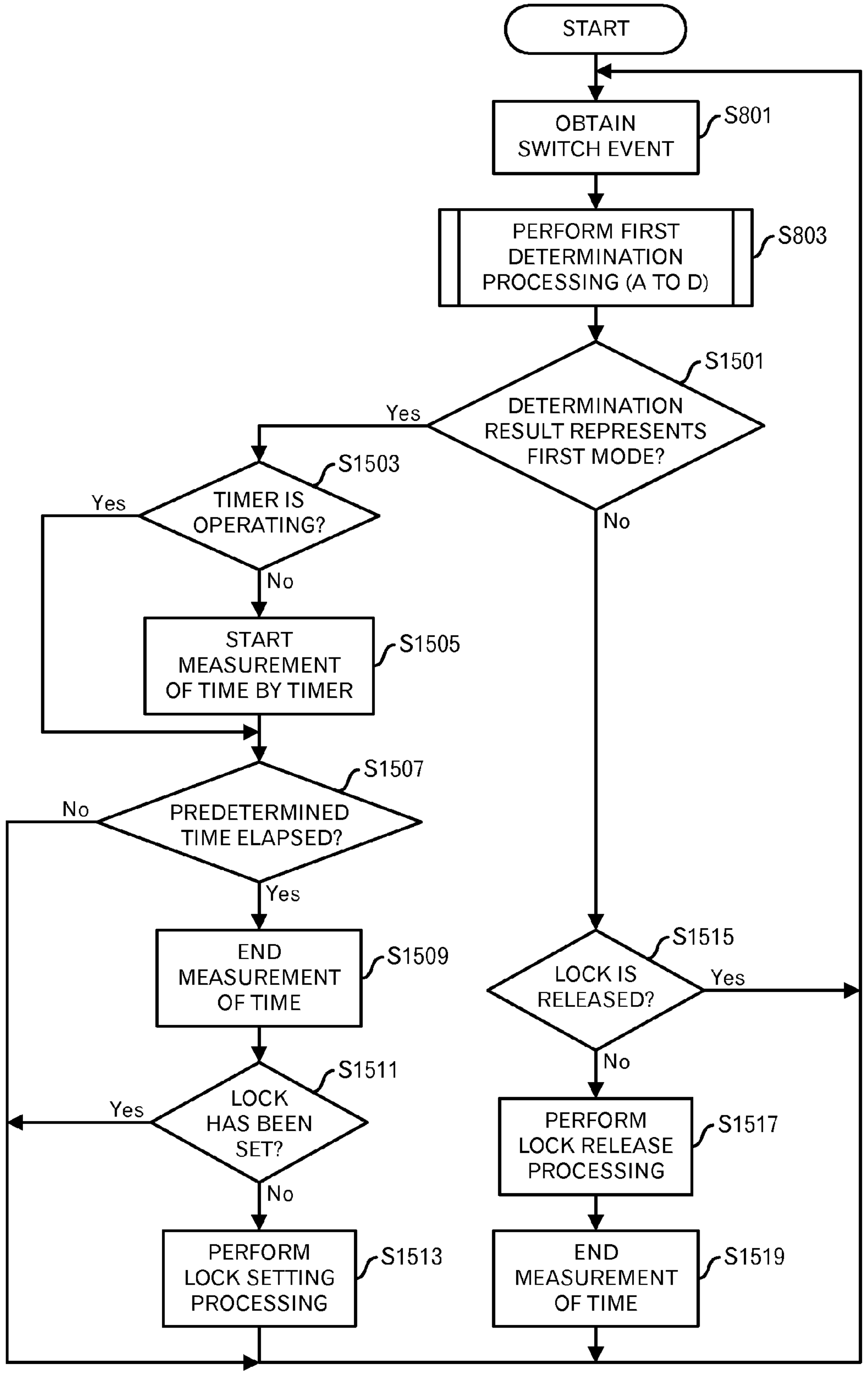
FIG. 15 is a diagram depicting an entire processing flow relating to a fifth embodiment.

Next, a processing in this embodiment will be explained. FIG. 15 illustrates an entire processing flow relating to the fifth embodiment. The processing at S801 and S803 is similar to that in FIG. 8.

The lock controller 705 determines whether the determination result represents the first mode or the second mode (S1501). When it is determined that the determination result represents the first mode, the lock controller 705 determines whether or not the timer is operating (S1503). The timer is used to measure the elapsed time since the first mode was detected. When it is determined that the timer is not operating, the lock controller 705 begins the operation of the timer (S1505), and the processing shifts to a processing of S1507. When it is determined that the timer is operating, the processing directly shifts to the processing of S1507.

The lock controller 705 determines whether or not the predetermined time elapsed since the first mode was detected (S1507). When it is determined that the predetermined time does not elapse since the first mode was detected, the processing returns to S801, and the aforementioned processing is repeated.

When it is determined that the predetermined time elapsed since the first mode was detected, the lock controller 705 ends the operation of the timer (S1509). Then, the lock controller 705 determines whether or not the lock has been set (S1511). When it is determined that the lock has been set, the processing returns to S801. When it is determined that the lock is not set, the lock controller 705 performs a lock setting processing (S1513), and the processing returns to the processing of S801. By this processing, the cellular phone terminal 100 becomes in a locked state.

When it is determined at S1501 that the determination result represents the second mode, the lock controller 705 determines whether or not the lock is released (S1515). When it is determined that the lock is released, the processing returns to S801. When it is determined that the lock is not released, the lock controller 705 performs the lock release processing (S1517), and ends the operation of the timer (S1519). Then, the processing returns to S801.

According to this embodiment, the lock is set after the predetermined time elapsed since the first mode was detected. Therefore, the frequent lock control operations are prevented.

[Embodiment 6]

In this embodiment, an example will be explained that, in a state that the cellular phone terminal 100 is not grasped, the supply of the power is suppressed.

Figure 16:
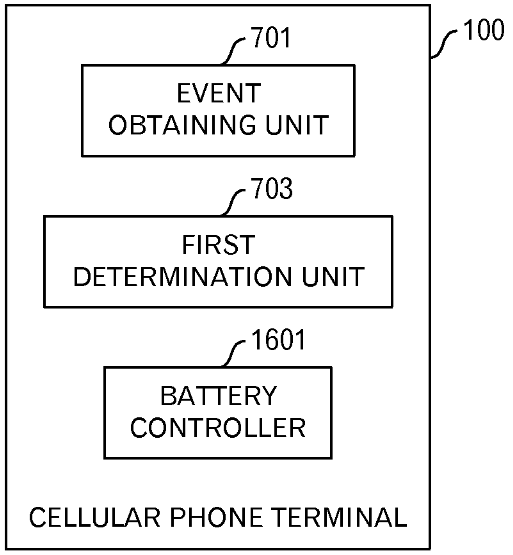
FIG. 16 is a diagram depicting a module configuration example of the cellular phone terminal relating to a sixth embodiment.

A module configuration relating to this embodiment will be explained. FIG. 16 illustrates an example of the module configuration of a cellular phone terminal 100 relating to the sixth embodiment. The event obtaining unit 701 and first determination unit 703 are as illustrated in FIG. 7. The cellular phone terminal 100 in this embodiment has a battery controller 1601. The battery controller 1601 controls the power supply by the battery 629. More specifically, the battery controller 1601 performs a processing for suspending the power supply to portions of the cellular phone terminal 100 from the battery 629, and a processing for resuming the restart of the suspended power supply. The battery controller 1601 may suspend and resume the power supply to the display unit 621, for example.

Figure 17:
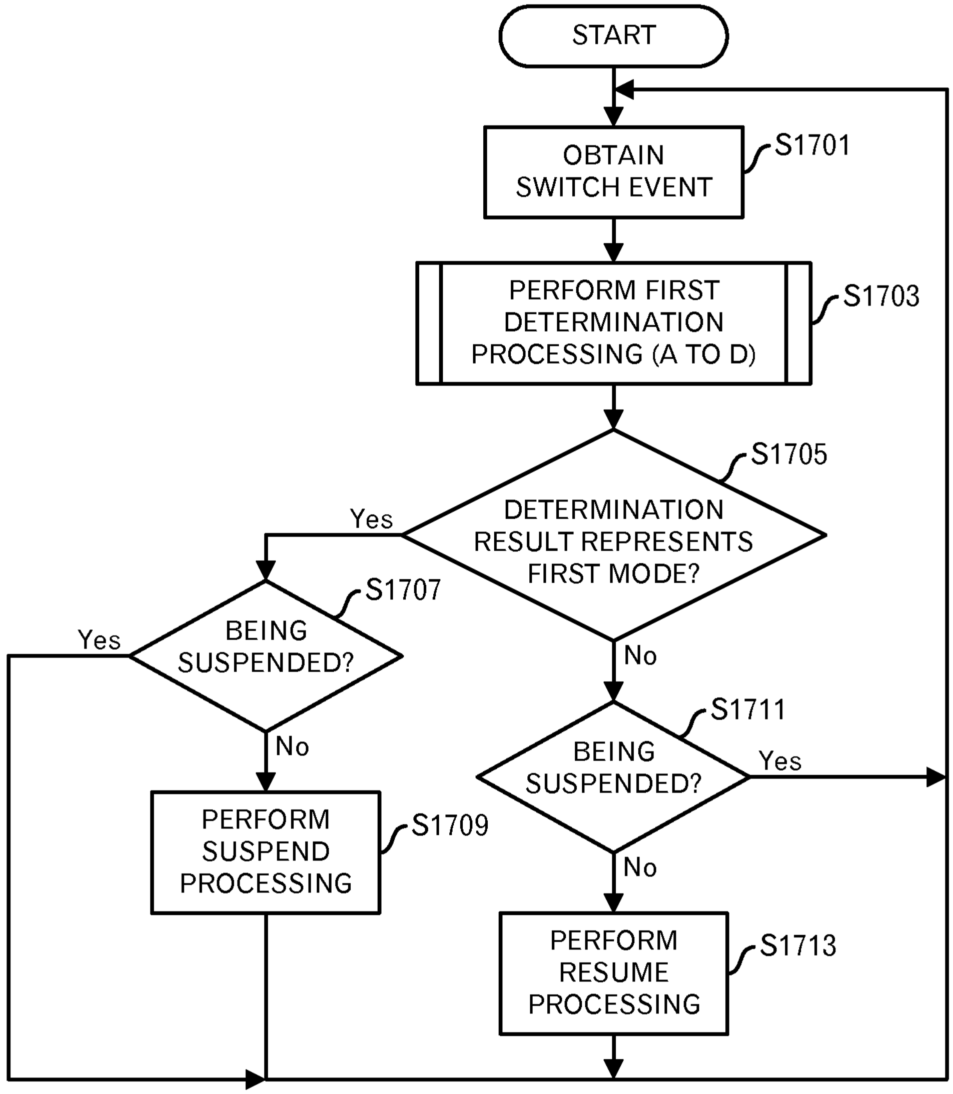
FIG. 17 is a diagram depicting an entire processing flow relating to the sixth embodiment.

Next, a processing in this embodiment will be explained. FIG. 17 illustrates an entire processing flow relating to the sixth embodiment. The event obtaining unit 701 obtains a switch event (S1701), and the first determination unit 703 performs the first determination processing (S1703), which is a similar processing described above. The first determination processing may be either of the aforementioned first determination processing A to D.

The battery controller 1601 determines whether the determination result represents the first mode or second mode (S1705). When it is determined that the determination result represents the first mode, the battery controller 1601 determines whether or not the power supply is partially suspended (S1707). When it is determined that the power supply is not partially suspended, the battery controller 1601 performs a processing for partially suspending the power supply (S1709). When the power supply is partially suspended, the processing returns to the processing of S1701.

When it is determined at S1705 that the determination result represents the second mode, the power controller 1601 determines whether or not the power supply is partially suspended (S1711). When it is determined that the power supply is partially suspended, the battery controller 1601 performs a processing for resuming the power supply, which is partially suspended (S1713). When it is determined that the power supply is not partially suspended, the processing returns to the processing of S1701.

According to this embodiment, when the cellular phone terminal 100 is released, the power supply is automatically suspended, and the power saving is always performed.

[Embodiment 7]

In this embodiment, an example will be explained that the power supply is partially suspended after a predetermined time elapsed since the first mode was detected.

The module configuration is as illustrated in FIG. 16.

Figure 18:
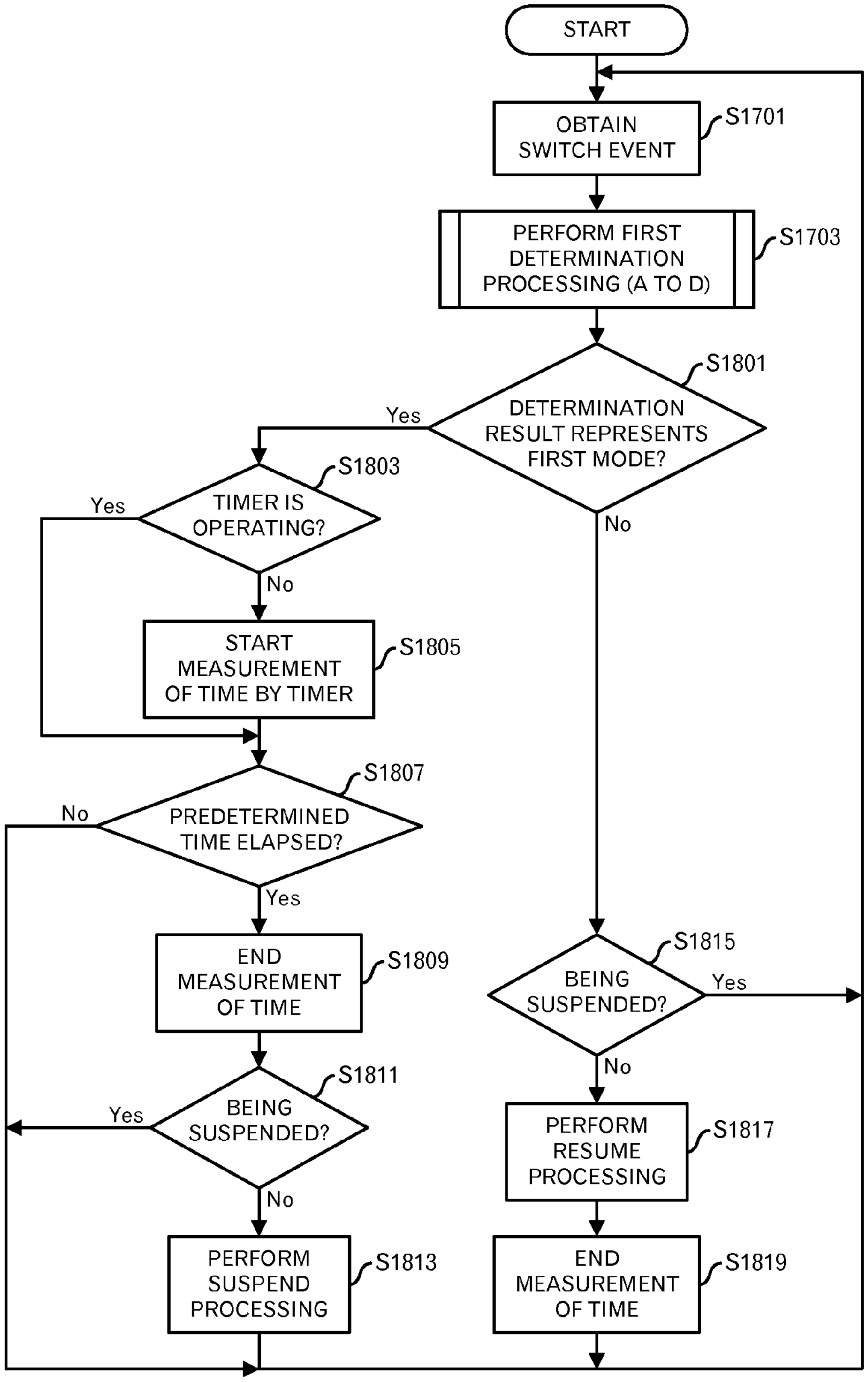
FIG. 18 is a diagram depicting an entire processing flow relating to a seventh embodiment.

Next, a processing in this embodiment will be explained. FIG. 18 illustrates an entire processing flow relating to the seventh embodiment. Similarly to FIG. 17, the event obtaining unit 701 obtains the switch event (S1701), and the first determination unit 703 performs a first determination processing (S1703). Any one of the first determination processing A to D may be employed.

Then, the battery controller 1601 determines whether the determination result represents the first mode or second mode (S1801). When it is determined that the determination result represents the first mode, the battery controller 1601 determines whether or not the timer is operating (S1803). The timer is used to measure the elapsed time since the first mode was detected, similarly to the aforementioned embodiment. When it is determined that the timer is not operating, the battery controller 1601 begins the operation of the timer (S1805), and the processing shifts to a processing of S1807. When it is determined that the timer is operating, the processing directly shifts to the processing of S1807.

The battery controller 1601 determines whether or not the predetermined time elapsed since the first mode was detected (S1807). When it is determined that the predetermined time does not elapse since the first mode was detected, the processing returns to the S1701, and the aforementioned processing is repeated.

When it is determined that the predetermined time elapsed since the first mode was detected, the battery controller 1601 ends the operation of the timer (S1809). Then, the battery controller 1601 determines whether or not the power supply is partially suspended (S1811). When it is determined that the power supply is partially suspended, the processing returns to the processing of S1701. On the other hand, when it is determined that the power supply is not partially suspended, the battery controller 1601 performs a processing for partially suspending the power supply (S1813), and the processing returns to the processing of S1701.

On the other hand, when it is determined at the S1801 that the determination result represent the second mode, the battery controller 1601 determines whether or not the power supply is partially suspended (S1815). When it is determined that the power supply is not partially suspended, the processing returns to the S1701. On the other hand, when it is determined that the power supply is partially suspended, the battery controller 1601 resumes the power supply, which is partially suspended (S1817), and ends the operation of the timer (S1819). Then, the processing returns to the processing of S1701.

According to this embodiment, because the lock is set after the predetermined time elapsed since the first mode was detected, the frequent battery control operation is prevented.

[Embodiment 8]

In this embodiment, an example will be explained that no operation event is accepted in a state that the cellular phone terminal 100 is not grasped.

Figure 19:
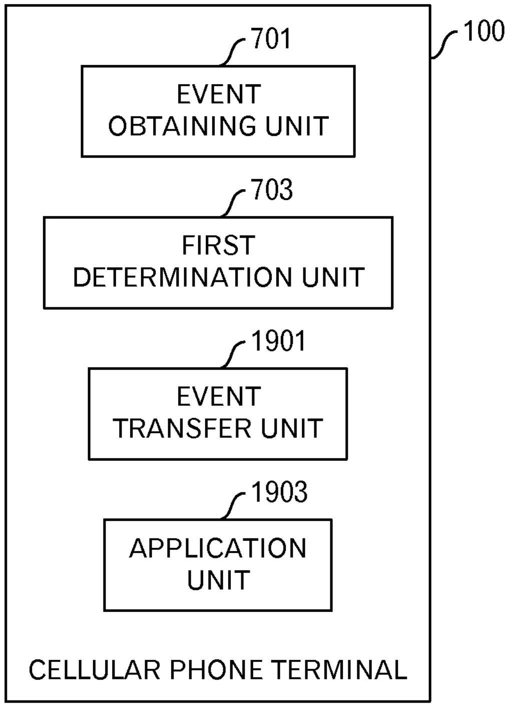
FIG. 19 is a diagram depicting a module configuration example of the cellular phone terminal relating to an eighth embodiment.

A module configuration relating to this embodiment will be explained. FIG. 19 illustrates an example of the module configuration of the cellular phone terminal 100 relating to the eighth embodiment. The event obtaining unit 701 and first determination unit 703 are similar to those in FIGS. 7 and 16. The cellular phone terminal 100 relating to this embodiment has an event transfer unit 1901 and application unit 1903. In this embodiment, the event obtaining unit 701 obtains an operation event from the touch pad 623 and keys 625 in addition to the events from the touch switches 101*a* to 101*d*. The operation event is an event to be transferred to the application unit 1903 in a normal state. The event transfer unit 1901 performs a processing to transfer or discard the operation event obtained by the event obtaining unit 701 to the application unit 1903 according to the mode determined by the first determination unit 703. The application unit 1903 performs an application processing in response to the operation event.

Figure 20:
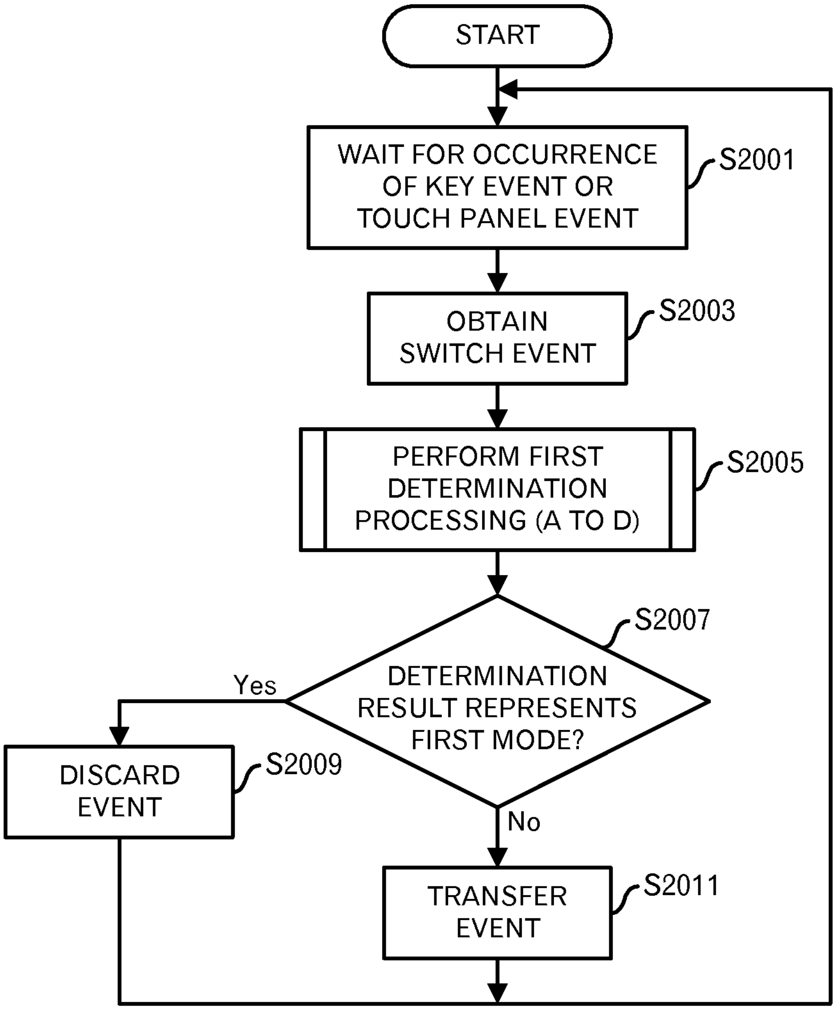
FIG. 20 is a diagram depicting an entire processing flow relating to the eighth embodiment.

Next, a processing in this embodiment will be explained. FIG. 20 illustrates an entire processing flow relating to the eighth embodiment. The event obtaining unit 701 waits for an occurrence of the key event or touch panel event (S2001). When the key event or touch panel event occurs, the event obtaining unit 701 obtains the switch event (S2003). The first determination unit 703 performs the first determination processing similar to the aforementioned embodiment (S2005). The event transfer unit 1901 determines whether the determination result represents the first mode or second mode (S2007). When it is determined that the determination result represents the first mode, the event transfer unit 1901 discards the key event or touch panel event without transferring to the application unit 1903 (S2009). When it is determined that the determination result represents the second mode, the event transfer unit 1901 transfers the event to the application unit 1903 (S2011). Then, the processing returns to the S2001.

In this example, an example was explained that the operation event to be transferred to the application unit 1903 was discarded, however, the operation event to be transferred to the operating system executed on the cellular phone terminal 100 may be discarded.

According to this embodiment, the operation when the user does not grasp is invalidated, so it is possible to prevent from performing malfunction by unintentional operation.

[Embodiment 9]

In this embodiment, an example will be explained that an alarm is stopped in a state that the cellular phone terminal 100 is not grasped.

Figure 21:
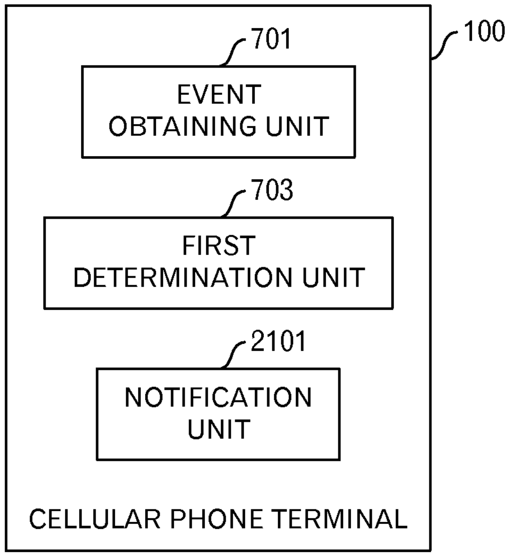
FIG. 21 is a diagram depicting a module configuration example of the cellular phone terminal relating to the ninth embodiment.

Next, a module configuration relating to this embodiment will be explained. FIG. 21 illustrates an example of the module configuration relating to the ninth embodiment. The event obtaining unit 701 and first determination unit 703 are similar to those in FIG. 7. The cellular phone terminal 100 in this embodiment has a notification unit 2101. The notification unit 2101 performs a notification processing activated by receiving a call or e-mail, for example, or wake-up function. A method of the notification includes sounds such as alarm sounds or ring or display and/or vibration that are other than the sounds.

Figure 22:
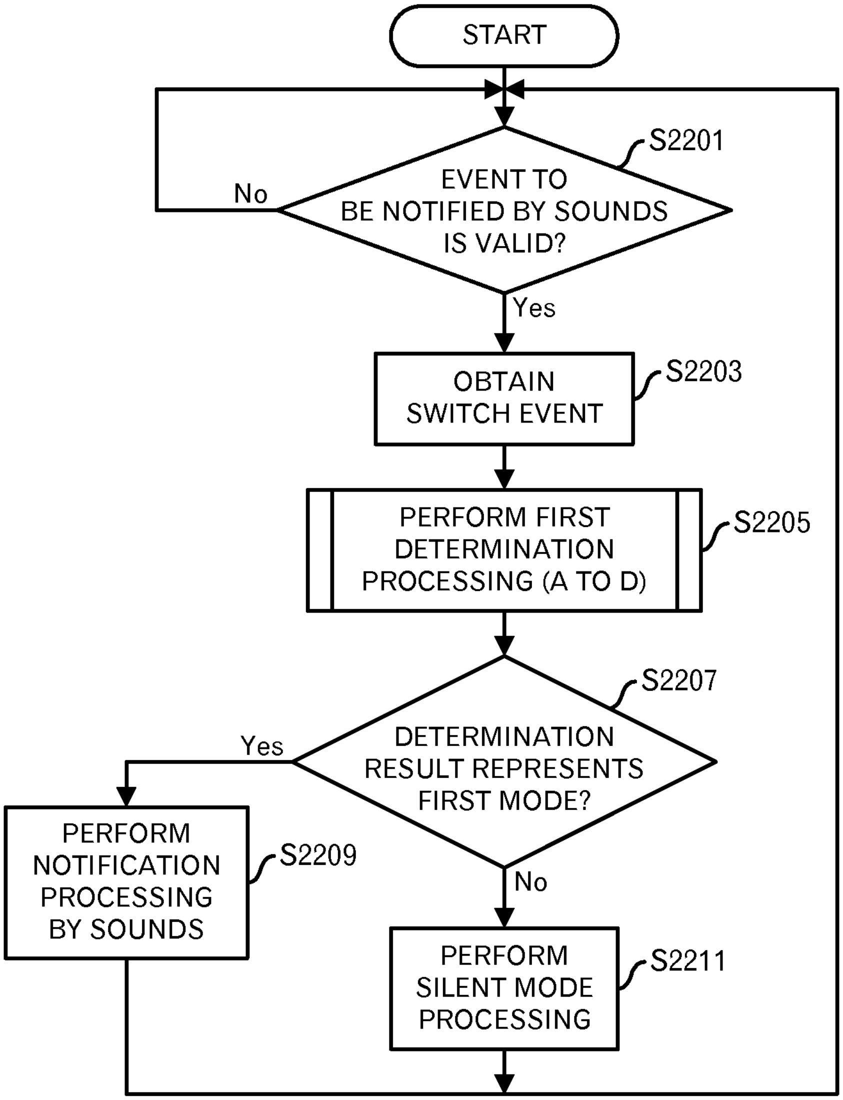
FIG. 22 is a diagram depicting an entire processing flow relating to the ninth embodiment.

Next, a processing in this embodiment will be explained. FIG. 22 illustrates an entire processing flow relating to the ninth embodiment. The notification unit 2101 determines whether or not the event to be notified by sounds is valid (S2201). For example, when it is the wake-up time, this event becomes valid. Moreover, until a stop instruction of the notification is made or a notification period elapsed, the state that the event is valid continues. When receiving the call, this event becomes valid. In case of receiving the call, the state that the event is valid may continue until the rejection of the call is instructed or the user responds to the call.

When the event to be notified by sounds is not valid, the determination processing of S2201 is repeated.

When it is determined that the event to be notified by sounds is valid, the event obtaining unit 701 obtains the switch event as described in other embodiments (S2203). Furthermore, the first determination unit 703 performs the first determination processing (S2205). Any one of the first determination processing A to D may be employed.

The notification unit 2101 determines whether the determination result represents the first mode or second mode (S2207). When it is determined that the determination result represents the first mode, the notification unit 2101 performs the notification processing by sounds (S2209). The notification unit 2101 outputs the notification sounds from the speaker 617.

On the other hand, when it is determined that the determination result represents the second mode, the notification unit 2101 performs a silent-mode processing. In other words, the notification unit 2101 stops the notification by sounds. For example, the notification unit 2101 may display the notification contents on the display unit 621, or make the vibration device 631 vibrate.

According to this embodiment, when the cellular phone terminal is grasped, the notification sounds such as alarm sounds or ring are stopped.

[Embodiment 10]

In this embodiment, an example will be explained that a direction of the display is changed based on the detection result of the touch switches 101*a* to 101*d*.

Figure 23:
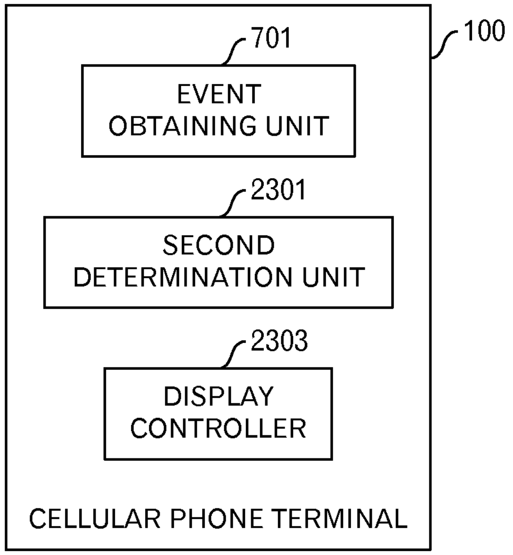
FIG. 23 is a diagram depicting a module configuration example of the cellular phone terminal relating to a tenth embodiment.

Next, the module configuration relating to this embodiment will be explained. FIG. 23 illustrates an example of the module configuration of the cellular phone terminal 100 relating to the tenth embodiment. The event obtaining unit 701 is as illustrated in FIG. 7. The cellular phone terminal 100 in this embodiment has a second determination unit 2301 and display controller 2303. The second determination unit 2301 determines the aforementioned mode and the direction of the cellular phone terminal 100. The display controller 2303 controls the display direction on the display unit 621 and the like.

Figure 24:
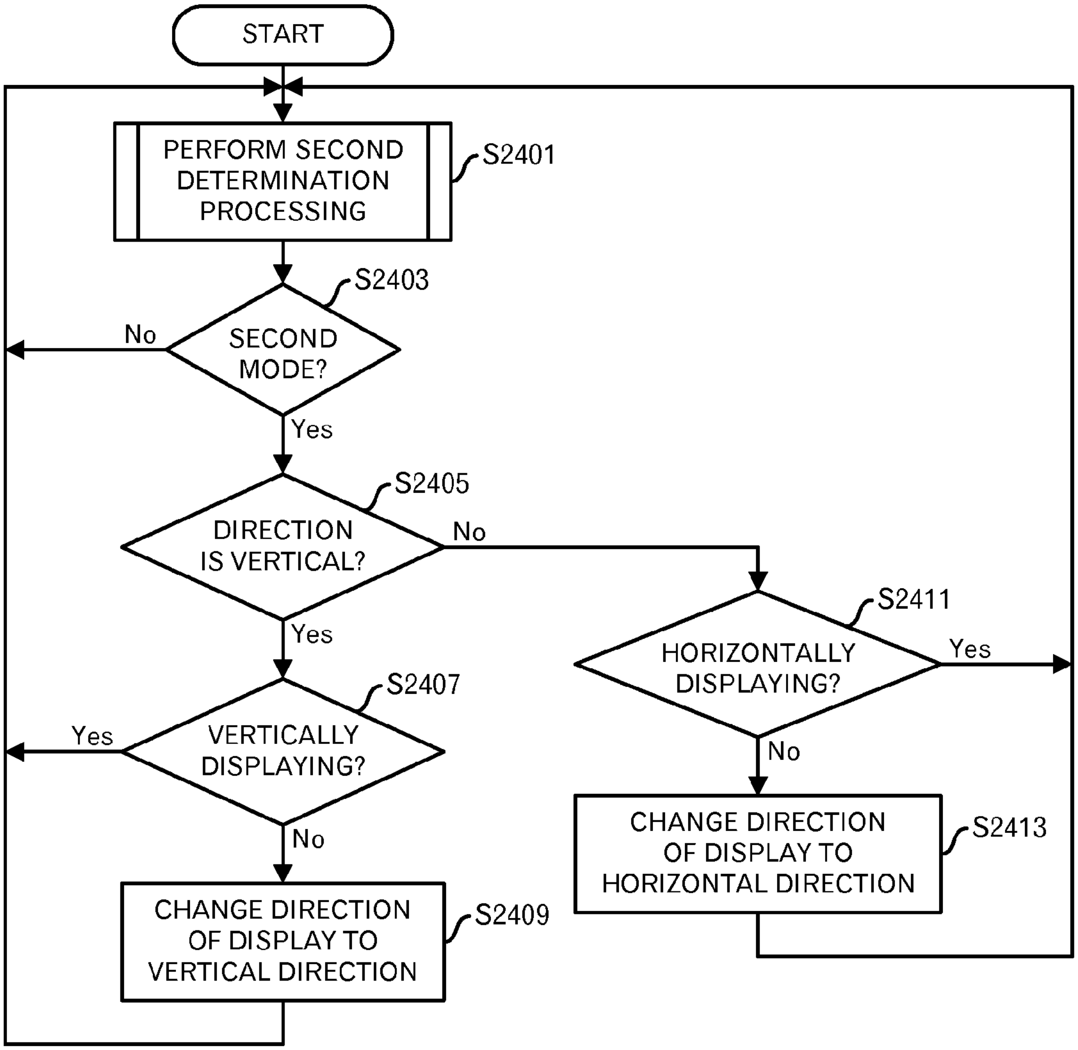
FIG. 24 is a diagram depicting an entire processing flow relating to the tenth embodiment.

Next, a processing in this embodiment will be explained. FIG. 24 illustrates an entire processing flow relating to the tenth embodiment. The second determination unit 2301 performs a second determination processing (S2401).

Figure 25:
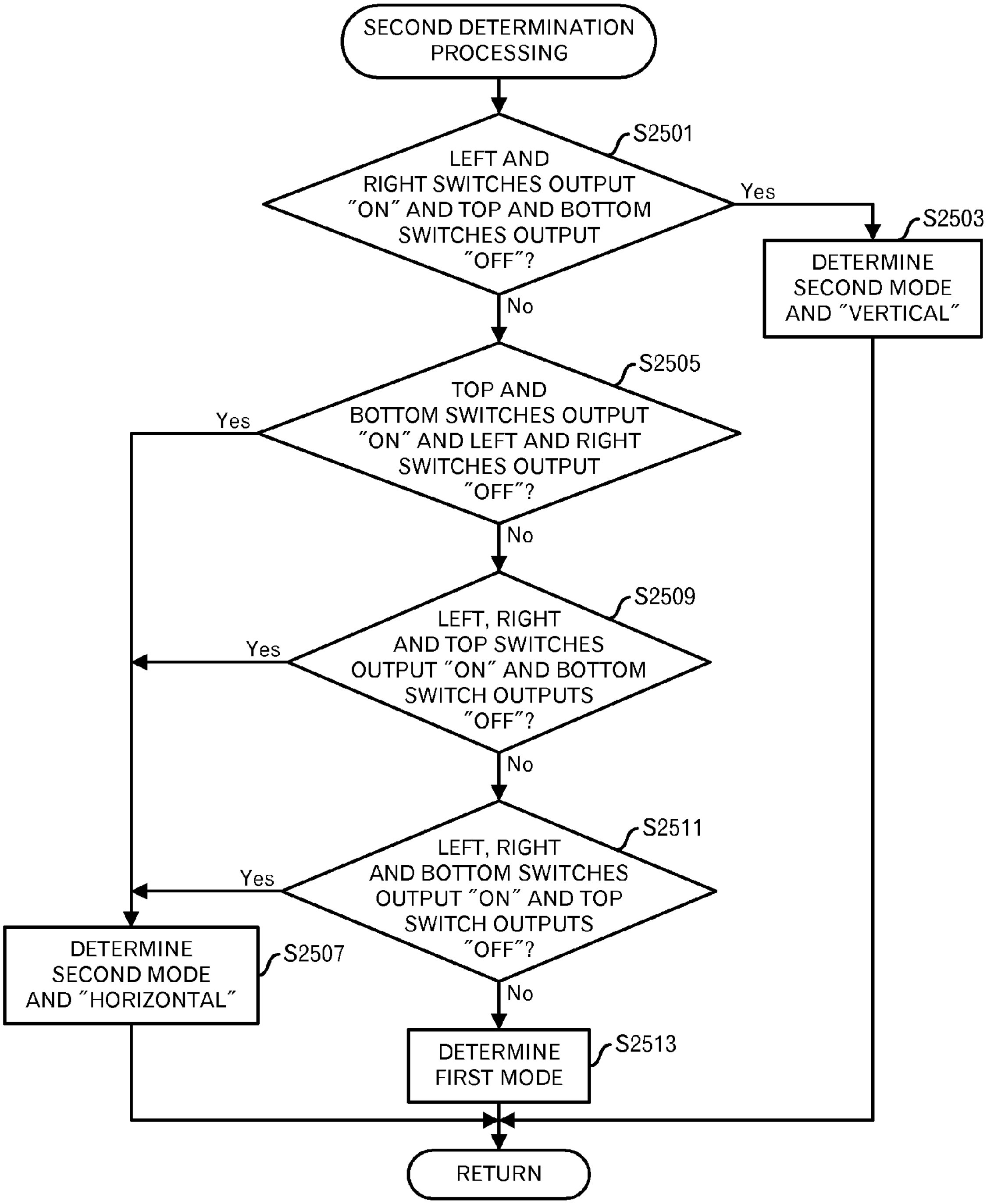
FIG. 25 is a diagram depicting a second determination processing flow.

FIG. 25 illustrates a flow example of the second determination processing. The second determination unit 2301 determines whether or not the present state is a state that the touch switch 101*a* and touch switch 101*b* detect “ON”, and the touch switch 101*c* and touch switch 101*d* detect “OFF” (S2501). When it is determined that the present state is the state that the touch switch 101*a* and touch switch 101*b* detect “ON”, and the touch switch 101*c* and touch switch 101*d* detect “OFF”, the second determination unit 2301 determines that the present mode is the second mode and the direction of the cellular phone terminal 100 is “vertical” (S2503), and the processing returns to the calling-source processing. This state corresponds to the state as illustrated in FIG. 3.

On the other hand, when it is determined that the present state is not the state that the touch switch 101*a* and touch switch 101*b* detect “ON” and the touch switch 101*c* and touch switch 101*d* detect “OFF”, the second determination unit 2301 determines whether or not the present state is a state that the touch switch 101*c* and touch switch 101*d* detect “ON” and the touch switch 101*a* and touch switch 101*b* detect “OFF” (S2505). When it is determined that it is in the state that the touch switch 101*c* and touch switch 101*d* detect “ON” and the touch switch 101*a* and touch switch 101*b* detect “OFF”, the second determination unit 2301 determines that the present mode is the second mode and the direction of the cellular phone terminal 100 is “horizontal” (S2507), and the processing returns to the calling-source processing. This state corresponds to the state as illustrated in FIG. 4.

On the other hand, when it is determined that the present state is not the state that the touch switch 101*c* and touch switch 101*d* detect “ON”, and the touch switch 101*a* and touch switch 101*b* detect “OFF”, the second determination unit 2301 determines whether or not it is in a state that the touch switch 101*a*, touch switch 101*b* and touch switch 101*c* detect “ON” and the touch switch 101*d* detects “OFF” (S2509). When it is determined that the present state is a state that the touch switch 101*a*, touch switch 101*b* and touch switch 101*c* detect “ON” and the touch switch 101*d* detects “OFF”, the second determination unit 2301 determines that the present mode is the second mode, and the direction of the cellular phone terminal 100 is “horizontal” (S2507), and the processing returns to the calling-source processing. This state corresponds to the state that the cellular phone terminal 100 is passed to the right hand as illustrated in FIG. 5.

On the other hand, when it is determined that the present state is not the state that the touch switch 101*a*, touch switch 101*b* and touch switch 101*c* detect “ON” and the touch switch 101*d* detects “OFF”, the second determination unit 2301 determines whether or not the present state is a state that the touch switch 101*a*, touch switch 101*b* and touch switch 101*d* detect "ON" and the touch switch 101*c* detects "OFF" (S2511). When it is determined that the present state is a state that the touch switch 101*a*, touch switch 101*b* and touch switch 101*d* detect "ON" and the touch switch 101*c* detects "OFF", the second determination unit 2301 determines that the present mode is the second mode, and the direction of the cellular phone terminal 100 is "horizontal" (S2507), and the processing returns to the calling-source processing. This state corresponds to the state as illustrated in FIG. 5.

On the other hand, when it is determined that the present state is not a state that the touch switch 101*a*, touch switch 101*b* and touch switch 101*d* detect "ON" and the touch switch 101*c* detects "OFF", the second determination unit 2301 determines that the present mode is the first mode (S2513), and the processing returns to the calling-source processing.

Returning to the explanation of the entire processing flow illustrated in FIG. 24, the display controller 2303 determines whether or not the mode in the determination result is the second mode (S2403). When it is determined that the present mode is not the second mode, the processing returns to the processing of S2401.

On the other hand, the display controller 2303 determines whether the direction of the cellular phone terminal 100 is "vertical" or "horizontal" (S2405). When it is determined that the direction of the cellular phone terminal 100 is "vertical", the display controller 2303 determines whether or not the display is being performed vertically on the display unit 621 (S2407). When it is determined that the display is being performed vertically, the processing returns to the processing of S2401. When it is determined that the display is not performed vertically, the display controller 2303 changes the direction of the display on the display unit 621 to the vertical direction (S2409).

When it is determined at S2405 that the direction of the cellular phone terminal 100 is "horizontal", the display controller 2303 determines whether or not the display is being performed horizontally on the display unit 621 (S2411). When it is determined that the display is being performed horizontally on the display unit 621, the processing returns to the processing of S2401. When it is determined that the display is not performed horizontally on the display unit 621, the display controller 2303 changes the direction of the display on the display unit 621 to the horizontal direction (S2413).

Accordingly, by detecting whether or not the top side and bottom side, which are other than the right and left surfaces, are touched simultaneously, it is possible to presume the grasped mode. Therefore, it is possible to presume the direction of the cellular phone terminal 100.

Whether or not either of the aforementioned entire processing flows is executed may be set by a user in advance. Moreover, in response to the user's instruction, a case where either of the aforementioned entire processing flows is executed and a case where any of the aforementioned entire processing flows is not executed may be switched each time.

Although the embodiments of the invention were explained above, this invention is not limited to those embodiments. For example, the aforementioned functional block configurations may not always correspond to program module configurations.

Moreover, the configurations of the storage areas are mere examples, and may be changed. Furthermore, as for the processing flow, as long as the processing results do not change, the turns of the steps may be exchanged, and plural steps may be executed in parallel.

The aforementioned embodiments are outlined as follows:

A disclosed portable apparatus relating to the embodiments includes: a first touch switch that is installed on a first surface of a housing of the portable apparatus; a second touch switch that are installed on a second surface of the housing, which is opposite to the first surface; and a determination unit configured to determine whether or not the first surface and the second surface are simultaneously touched, based on outputs of the first touch switch and the second touch switch.

Thus, by detecting whether or not the two opposite surfaces in the housing are simultaneously touched, it is possible to determine whether or not the portable apparatus is grasped by the user.

Moreover, the portable apparatus may further include a third touch switch that is installed on a third surface that is different from the first surface and the second surface. Furthermore, the determination unit may determine whether or not the third surface is simultaneously touched in addition to the first surface and the second surface, based further on an output of the third touch switch.

Accordingly, by detecting whether or not an additional surface is simultaneously touched, it is possible to presume the user's grasped state.

Moreover, the determination unit may determine a direction of the portable apparatus, based on touched states of the first to third surfaces.

With this configuration, the direction of the portable apparatus can be presumed based on the grasped state.

Moreover, the aforementioned portable apparatus may further include a proximity sensor that senses an adjacent object. Furthermore, the aforementioned determination unit may further determine whether or not any adjacent object exists.

With this configuration, it is possible to presume the unused state such as in a pocket.

Moreover, the aforementioned portable apparatus may further include: a first controller configured to release a lock function upon determining that the first surface and the second surface are simultaneously touched.

Because the lock function is released when the user grasps the portable apparatus, the user's release operation is eliminated, and it is possible for the user to use the portable apparatus soon.

Moreover, the first controller may activate the lock function upon determining that the first surface and the second surface are not simultaneously touched.

With this configuration, when the portable apparatus is released, the lock is automatically made, and the security is always secured.

Moreover, the portable apparatus may further include: a second controller configured to resume a suspended power supply upon determining that the first surface and the second surface are simultaneously touched.

Accordingly, because the power supply is automatically resumed when the user grasps, it is possible for the user to use the suspended function soon when the user grasps the portable apparatus.

Moreover, the second controller may suspend a power supply upon determining that the first surface and the second surface are not simultaneously touched.

With this configuration, the power supply is automatically suspended when the portable apparatus is released, and the power saving can be realized.

Moreover, the aforementioned portable apparatus may further include: a transfer unit that discards an operation event to be transferred, upon determining that the first surface and the second surface are not simultaneously touched.

Accordingly, the operation is invalidated when the user does not grasp the portable apparatus, so the malfunction by the unintentional operation can be prevented.

Moreover, the aforementioned portable apparatus may further include: a notification unit that stops notification by sounds upon determining that the first surface and the second surface are simultaneously touched.

Accordingly, the notification sounds are stopped when the user grasps the portable apparatus.

Incidentally, it is possible to create a program causing a processor to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A portable apparatus, comprising:

a first touch switch that is installed on a first side of a housing of the portable apparatus;

a second touch switch that is installed on a second side of the housing, the second side being opposite to the first side;

a display surface installed at a front of the housing, the front of the housing being different from the first side and the second side and having a normal that is substantially perpendicular to normals of the first side and the second side; and a determination unit configured to:

determine whether the first side and the second side are simultaneously touched, based on outputs of the first touch switch and the second touch switch; and determine, based on the determination as to whether the first side and the second side are simultaneously touched, one or more of the following: a mode of the portable apparatus and a direction of the portable apparatus.

2. The portable apparatus as set forth in claim 1, further comprising:

a third touch switch that is installed on a back of the housing, the back of the housing being opposite to the front of the housing, and wherein the determination unit is further configured to:

determine whether the back of the housing is simultaneously touched in addition to the first side and the second side, based further on an output of the third touch switch; and determine, based on the determination as to whether the back of the housing is simultaneously touched in addition to the first side and the second side, one or more of the following: the mode of the portable apparatus and the direction portable apparatus.

3. The portable apparatus as set forth in claim 2, wherein the determination unit is configured to determine the direction of the portable apparatus, based on touched states of the first side, the second side, and the back of the housing.

4. The portable apparatus as set forth in claim 1, further comprising:

a proximity sensor configured to sense an adjacent object, and wherein the determination unit is further configured to determine whether any adjacent object exists.

5. The portable apparatus as set forth in claim 1, further comprising:

a first controller configured to release a lock function based on the determined mode of the portable apparatus upon determining that the first side and the second side are simultaneously touched.

6. The portable apparatus as set forth in claim 5, wherein the first controller is further configured to activate the lock function based on the determined mode of the portable apparatus upon determining that the first side and the second side are not simultaneously touched.

7. The portable apparatus as set forth in claim 1, further comprising:

a second controller configured to resume a suspended power supply based on the determined mode of the portable apparatus upon determining that the first side and the second side are simultaneously touched.

8. The portable apparatus as set forth in claim 7, wherein the second controller is further configured to suspend a power supply based on the determined mode of the portable apparatus upon determining that the first side and the second side are not simultaneously touched.

9. The portable apparatus as set forth in claim 1, further comprising:

a transfer unit configured to discard an operation event to be transferred based on the determined mode of the portable apparatus, upon determining that the first side and the second side are not simultaneously touched.

10. The portable apparatus as set forth in claim 1, further comprising:

a notification unit configured to stop notification by sounds based on the determined mode of the portable apparatus upon determining that the first side and the second side are simultaneously touched.

11. A computer-readable, non-transitory storage medium storing a program for causing a processor in a portable apparatus to execute a process, comprising:

determining whether a first side of a housing of the portable apparatus is touched, based on an output of a first touch switch installed on the first side, the portable apparatus having a display surface installed at a front of the housing where the front of the housing is different from the first side and has a normal that is substantially perpendicular to a normal of the first side;

determining whether a second side of the housing, which is opposite to the first side and which has a normal that is substantially perpendicular to the normal of the front of the housing, is touched simultaneously to the first side, based on an output of a second touch switch installed on the second surface; and determining, based on the determination as to whether the first side and the second side are simultaneously touched, one or more of the following: a mode of the portable apparatus and a direction of the portable apparatus.

12. A method, comprising:

determining, by using a processor in a portable apparatus, whether a first side of a housing of the portable apparatus is touched, based on an output of a first touch switch installed on the first side, the portable apparatus having a display surface installed at a front of the housing where the front of the housing has a normal that is substantially perpendicular to a normal of the first side;

determining, by using the processor, whether a second side of the housing, which is opposite to the first side, is touched simultaneously to the first side, based on an output of a second touch switch installed on the second surface; and determining, based on the determination as to whether the first side and the second side are simultaneously touched, one or more of the following: a mode of the portable apparatus and a direction of the portable apparatus.

* * * * *